April 21, 1970     A. E. VINCENT     3,507,448
INTEREST CALCULATOR

Filed Nov. 27, 1968     2 Sheets-Sheet 1

INVENTOR
ARTHUR E. VINCENT
BY
ATTORNEYS

April 21, 1970 A. E. VINCENT 3,507,448
INTEREST CALCULATOR
Filed Nov. 27, 1968 2 Sheets-Sheet 2
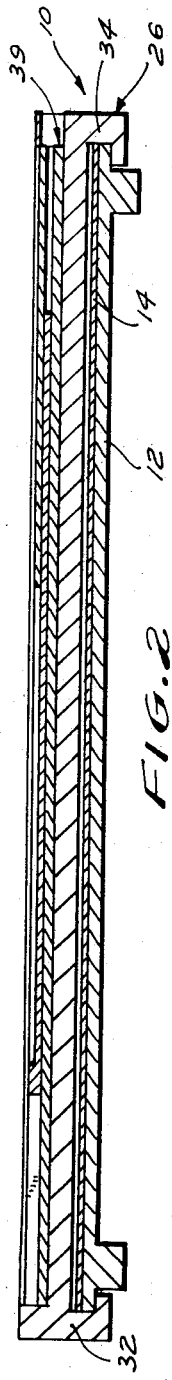
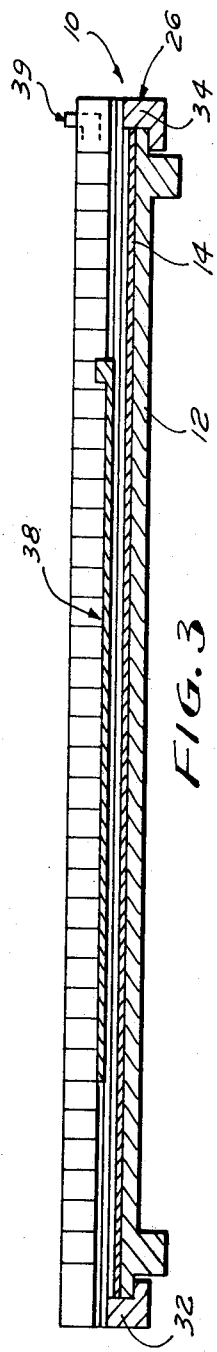
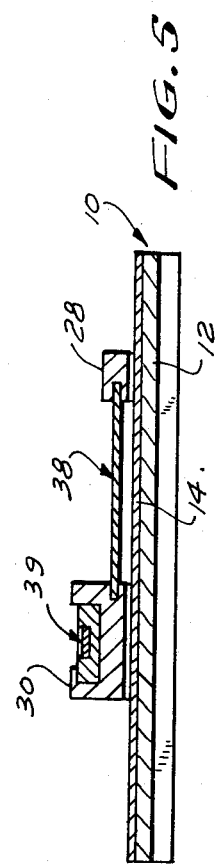
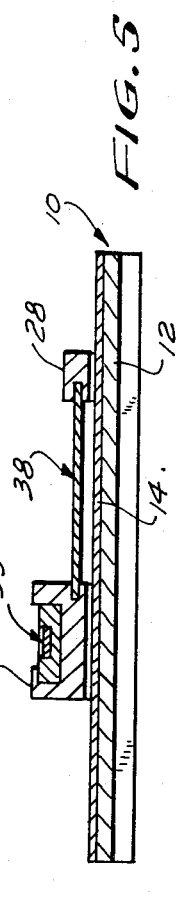
INVENTOR
ARTHUR E. VINCENT
BY
ATTORNEYS

United States Patent Office 3,507,448
Patented Apr. 21, 1970

3,507,448
INTEREST CALCULATOR
Arthur E. Vincent, Dolgeville, N.Y. 13329
Continuation-in-part of application Ser. No. 594,440,
Nov. 15, 1966. This application Nov. 27, 1968, Ser.
No. 779,399
Int. Cl. G06c 3/00
U.S. Cl. 235—85      2 Claims

ABSTRACT OF THE DISCLOSURE

An apparatus is provided for correlatively positioning a plurality of scales in such manner that a particular value appearing on one scale may readily be determined. The scales are adapted to be shifted with respect to one another in accordance with a mathematical computation.

CROSS REFERENCE TO RELATED APPLICATIONS

The present application constitutes a continuation-in-part of U.S. patent application S.N. 594,440 filed on Nov. 15, 1966, now abandoned for a Vincent Interest Calculator.

BACKGROUND OF THE INVENTION

Heretofore, an accountant or taxpayer had to go through a complex, mathematical computation in order to determine the factor which when multiplied by the monthly payments to be made in accordance with an installment payment contract, represents the portion of the payment which may be deducted from the taxpayer's income tax return in accordance with the Federal Tax Regulations. Several variables must be taken into consideration in the computation of the deduction including the number of months of the contract, the number of years the contract has already run, the month in which the taxpayer's tax year ends, the month when the first payment on the contract was made, and also, the month when the taxpayer entered into the contract. The Federal Government then assumes an interest rate of 6% and provides a mathematical formula which represents the deductible interest portions of the installment contract payments.

Because of the complexity of the computation required in order to calculate what is usually a relatively small deductible sum, many taxpayers and accountants have estimated the value of this deduction. This has resulted in many instances in an inaccurate estimate being made and an incorrect return being filed.

SUMMARY OF THE INVENTION

It is therefore a principal object of the present invention to provide an improved calculator for facilitating the computation of the tax deductible portion of payments made in accordance with an installment sale contract and for making other similar calculations.

A further object is to provide a calculator of the type described which is relatively simple to manufacture and operate and which may be economically produced.

These and other objects and advantages are attained in accordance with the present invention by providing a calculator including a base member having on one surface a scale containing the factor sought to be determined arranged in a rectangular array. A first member provided with information relating to the calculations to be made is mounted to the base and is adapted to be shifted with respect thereto along one axis of the rectangular array. A second member is mounted to the first member and is also provided with additional information necessary to the calculation to be made. The second member is adapted to be shifted with the first member and also to shift relative to the first member in a direction parallel to the other axis of the rectangular array. A third member containing still further information relating to the calculation sought to be made is also mounted to the first member and is adapted to be shifted relative to the first member in a direction parallel to the direction of motion of the second member. This third member includes two scales, one of which is further shiftable with respect to the other, the direction of motion again being along an axis parallel to the axis of motion of the second member.

Thus, the many variables that are to be taken into consideration in order to compute the desire factor are contained on the various scales which comprise the calculator of the present invention. The scales are adapted to be shifted to a correlative position which facilitates the determination of the desired factor which is contained on the first scale.

BRIEF DESCRIPTION OF THE DRAWINGS

In the accompanying drawings:

FIG. 2 is a section view taken along reference line 2—2 of FIG. 1;

FIG. 3 is a sectional view taken along reference line 3—3 of FIG. 1;

FIG. 4 is a fragmentary sectional view taken along reference line 4—4 of FIG. 1 and, FIG. 5 is a sectional view taken along reference line 5—5 of FIG. 1.

DESCRIPTION OF THE PREFERRED EMBODIMENT

Figure 1:
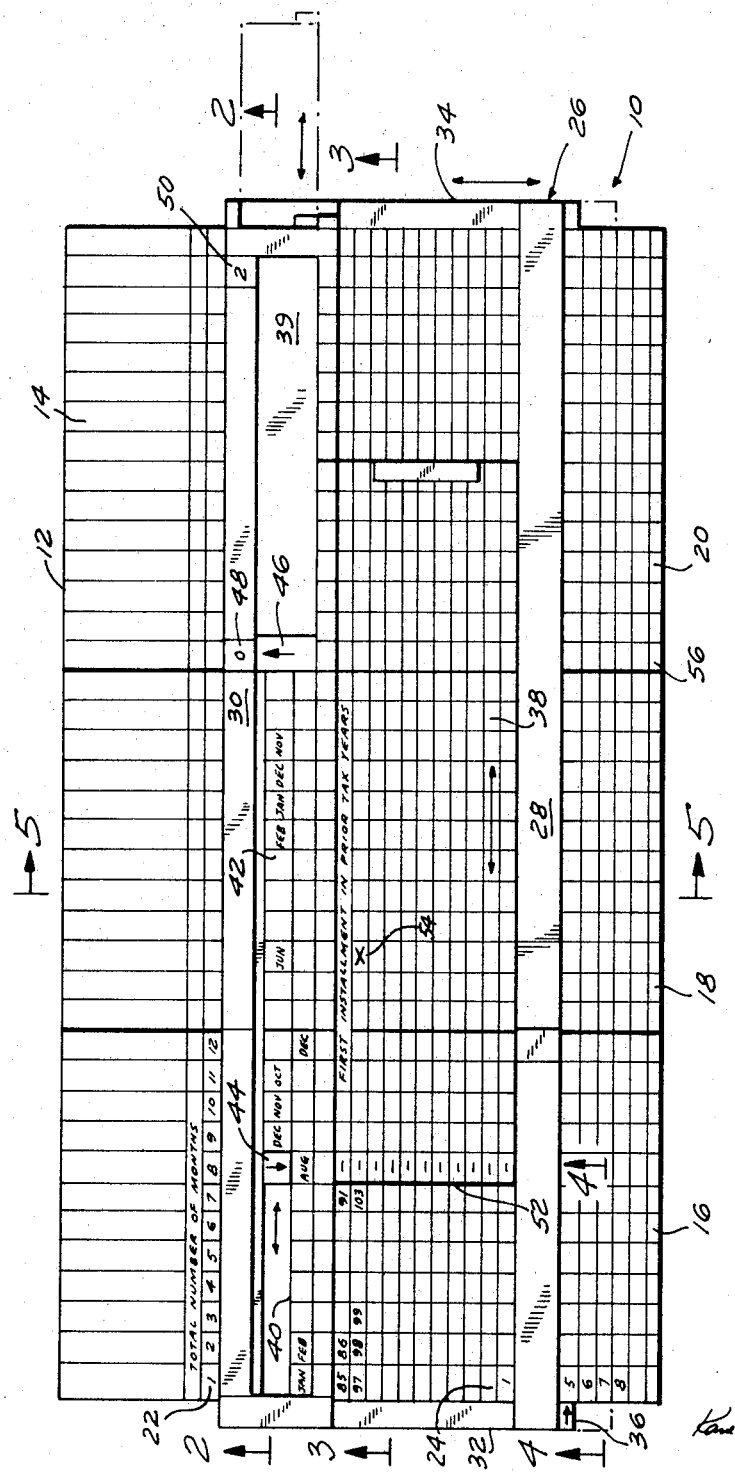
FIG. 1 is a top plan view of a calculator produced in accordance with the present invention and shows the various scales involved and their axes of movement.

Reference is now made to the accompanying drawing wherein the calculator 10 of the present invention is shown as comprising a plurality of scales which may be correlatively positioned with respect to each other. In this regard, the calculator is shown as including a flat bed base structure 12 upon which the various scales are supported. It should be understood at the outset that with very minor modifications, the base structure 12 may be produced in the form of a cylindrical member with corresponding movable scales designed to be shifted along an axis parallel to the longitudinal axis of the base or in an arcuate path concentric with the cylindrical member as has heretofore been disclosed in the referenced parent application.

Each of the scales of the present invention is divided by a plurality of spaced horizontal and vertical lines and for each scale the spacing of the horizontal and vertical lines is the same as that for each of the other scales thus permitting the horizontal and vertical alignment of the elements of the various scales.

The horizontal length of the top surface 14 of the base structure 12 is divided into three sections, 16, 18 and 20. Sections 18 and 20 contain factor bearing scales that are utilized when the first installment, as provided in an installment sale contract, is made in the current tax year and each individual rectangle of the scales contains a factor by which the monthly payment is to be multiplied to determine the tax deductible amount. The utilization of the scales will be described in more detail forthwith. Section 16, which is the extreme left section, is divided into two portions, an upper portion 22 which includes 12 vertical columns and represents the total number of months of the contract and a lower portion 24 that includes a vertical arrangement of the number of years that the contract has been in effect. Thus, on each horizontal line of the upper portion 22, the number of months are set out by years so that the first line relates to the first year and includes months 1 through 12; the second line relates to the second year and includes 13 through 24, and so on, until the eighth line which includes months 85 through 96 and the last line which includes months 97 through 108. The lower portion 24 of section 16 includes a scale in which the number of years that the contract has been in effect is set out vertically reading from top to bottom aligned with the extreme left section of scale 22.

With regard to sections 18 and 20 and the scales contained thereon, it should be noted that both sales relates to those factors which are to be used when the first payment is to be made in the current tax year. In this regard, the scales of sections 18 and 20 are provided respectively to account for both the instance where the first payment is to be made in the same months as that in which the contract is signed or the next proceeding month and also the intsance where the first payment was not due until two months after the contract was signed. The scale of section 18 relates to the former and the scale of section 20 is applicable under the latter circumstances.

A sliding member 26 is provided which is adapted to be vertically shifted with respect to the base structure 12. Sliding member 26 comprises, in essence, a rectangular frame defined by cross members 28 and 30 and side members 32 and 34. The side members 32 and 34 are adapted to ride along the vertically extending sides of the base structure, thus permitting the sliding member 26 to be vertically shifted with respect to the base structure while maintaining their horizontal alignment therewith. In use, the amount that the sliding member 26 is to be shifted is determined by the number of years that have elapsed since the contract was entered into and hence an arrow 36 is provided at the lower corner of side wall 32 of member 26. The arrow is adapted to align with and indicate which of the years set out in scale 24 is under consideration. In the position depicted in the accompanying figure, the 5th year after the contract was entered is the year presently under consideration since the arrow 36 is aligned with the numeral 5 of scale 24.

A slidable member 38 is mounted between cross members 28 and 30 and is adapted to be horizontally shifted with respect to member 26 and also to be vertically shifted along with member 26. In this regard, the bottom edge of top cross member 30 and the top edge of the bottom cross member 28 cooperate in forming a track in which member 38 rides. Member 38 includes a scale that contains the various factors by which the monthly installment is to be multiplied in order to determine the deductible amount when the first installment under the installment sales contract was to be made in some prior tax year. The information contained in the scale of member 38 is arranged in the same rectangular array as that defining each of the other scales.

The top cross member 30 of member 26 is also provided with a horizontally shiftable section 39. Section 39 in turn includes two horizontally extending portions 40 and 42, the latter being horizontally shiftable with respect to the former. While both portions are adapted to move as a part of section 39, portion 40 includes 12 sections set out in side-by-side arrangement each one bearing indicia relating to the last day of succeeding months. Thus, the first section is designated January 31, the second section February 28 or 29, and so on, until the last two which are designated November 30 and December 31, respectively. Portion 42 which comprises the other portion of member 38 is similarly broken up into a number of sections arranged in side-by-side array. The extreme left section 44 contains a downwardly pointing arrow which is to be aligned with the month on scale 40 that relates to the end of the taxpayer's year. The remaining sections of scale 42 relates to the month in which the first payment of the installment contract was to be made and in this regard the various months are set out in reverse order from left to right so that the section adjacent arrow 44 represents the month December, the one to the right of it is November, followed by October, September, and so on down to January after which the months repeat themselves in this same reverse order. As was previously stated, position 40 is fixed with respect to member 38 while section 42 is adapted to be horizontally shifted with respect to either section 38 or 40. Section 38 includes an upwardly directed arrow 46 which is designed to be aligned with either box 48 or 50 both of which are fixed with respect to member 30. Box 48 is located in alignment with the left most position of section 20 and is used when the first payment in the sales contract was to be made in the month the contract was entered into or in the next proceeding month. Box 50 is used when the first payment under the contract was to be made two months after the contract was entered into.

The use of the calculator is as follows: Assume that the following conditions exist. A taxpayer's taxable year ends on Aug. 31, 1969. In June of 1964 the taxpayer entered into a contract that was due to last for 91 months, the first payment being due the following month.

The calculator would thus be set in the manner shown in the accompanying drawing, that is, the arrow 44 of scale 42 would be shifted to a position directly over the August section of scale 40, this corresponding to the last month of the taxpayer's taxable year. The entire scale 38 would then be shifted so that the arrow 46 lines with block 48. Since the contract had been entered into five years before the end of the taxpayer's taxable year, the entire section 26 would then be vertically shifted until the arrow 36 aligned with the numeral 5 of scale 24. The horizontally shiftable scale 38 would then be positioned so that the left edge 52 of scale 38 aligned with numeral 91 which represents the total number of months of the installment sales contract. The correct factor would then be determined by the intersection of the vertical column determined by the month in which the contract was entered into on scale 42 and the horizontal column determined by the position of the month 91. In the present case and X is located in the position where the factor may be read.

In those instances where the first installment was made in the present taxable year, scales 18 and 20 are utilized and in this regard the extreme left vertical column 56 of scale 20 contains the number of months that the contract is to run while the remaining portions of scale 18 and 20 contain the various factors. Scales 42 and 40 are aligned as before. That is, the arrow 44 is set over the section scale 40 corresponding to the month in which the taxpayer's year ends and the desired factor is determined by reading the intersection of the month in which the contract was entered into (scale 42) with the number of months of the contract (determined by the proper horizontal line passing through vertical line 56). Scale 38 should be shifted as before so that the arrow 46 lines up with either blocks 48 or 50 depending on when the first payment was made. If the first payment had been due two months after the contract had been entered into, section 38 would have been further shifted to the right so that arrow 46 lines up with block 50.

Thus, in accordance with my invention, a calculator is provided which readily and easily enables a taxpayer or accountant to determine the factor by which the monthly payment under an installment sales contract is to be multiplied to determine the tax deductible portion of the installment payments.

Having thus described my invention, I claim:

1. An improved calculator for correlatively positioning a plurality of scales in such manner that a particular value appearing on one of the scales may readily be determined comprising: a base structure having a plurality of scales disposed upon one surface thereof in rectangular array; a first member monuted to said base structure and shiftable with respect thereto in a direction parallel to one axis of said rectangular array, said member including scale portions disposed thereon and a portion adapted to be indexed with respect to said base structure scales; a second member mounted to said first member and adapted to be shifted therewith, said second member having scales disposed thereon and being further adapted to be shifted relative to said first member in a direction parallel to the other axis of said rectangular array; a third member mounted to said first member and having scales disposed thereon, said third member being adapted to be shifted with said first member and further adapted to be shifted relative to said first member in a direction parallel to the path of motion of said second member; and a fourth member mounted to said third member having a scale thereon and adapted to be shifted with said third member and further adapted to be shifted relative to said third member in a direction parallel to the path of travel of said second and third members wherein said base structure and first, second, third and fourth members each include scales containing information disposed thereon in rectangular array and adapted to cooperate with said base scales in determining said particular value.

2. The invention in accordance with claim 1 wherein said particular value comprises a factor by which a taxpayer's monthly payment under the terms of an installment sales contract may be multiplied to determine the proportion of the taxpayer's payments under such contract that are deductible in accordance with the federal income tax laws wherein said base structure includes scales containing the number of years the contract was in effect, the number of months of the contract and the desired factors; said second member includes further scales containing the factor by which said payment is to be multiplied, said third member includes a scale setting forth the month in which the taxpayer's year ends and said fourth member includes a scale relating to the month in which the contract was entered into.

References Cited

UNITED STATES PATENTS

| | | | |
|---|---|---|---|
| 1,659,246 | 2/1928 | Drew et al. | 235—89 |
| 3,372,869 | 3/1968 | Motte et al. | 235—70 |
| 3,412,933 | 11/1968 | Woodward | 235—89 |

STEPHEN J. TOMSKY, Primary Examiner

U.S. Cl. X.R.

235—89